Patented Jan. 18, 1938

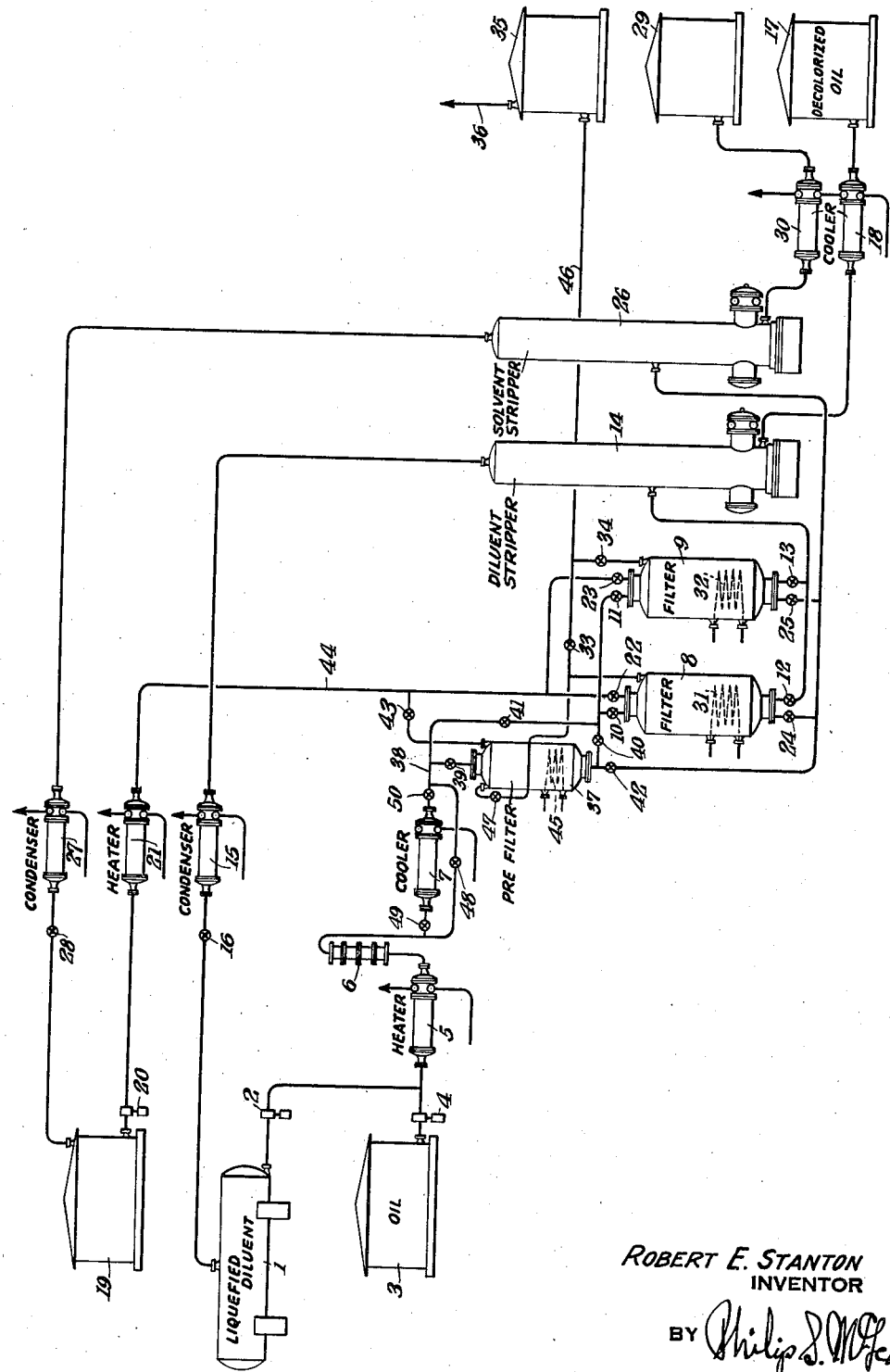

2,106,071

UNITED STATES PATENT OFFICE 2,106,071

DECOLORIZING PETROLEUM OILS

Robert E. Stanton, Denver, Colo., assignor to The Petroleum Processes Corporation, Wichita, Kans., a corporation of Kansas Application March 7, 1934, Serial No. 714,494

1 Claim. (Cl. 196—147)

This invention relates to the removal of coloring matter and certain extraneous material from petroleum oils, and is concerned more particularly with the removal of various asphaltic and ceresenic compounds, or other color-producing substances from petroleum lubricating oils or the components thereof, for the purpose of improving the color, demulsibility and other desirable characteristics of such lubricating oils.

The general objects of the invention are to effect such decolorization simply and economically, with a minimum of apparatus and materials and to secure in the end a high grade decolorized product.

Other, more specific objects and the novel features of structure and process by which the same are attained will appear as the specification proceeds.

The drawing accompanying and forming part of the specification illustrates one practical embodiment and mode of operation but as the same is primarily by way of disclosure it will be appreciated that both structure and process may be modified all within the true spirit and broad scope of the invention as hereinafter defined and broadly claimed.

The single view is a flow diagram of the process.

Briefly the invention comprises subjecting the petroleum oil to filtration, either by percolation or contacting, with fuller's earth or a similar adsorption decolorizing medium, after first diluting said petroleum oil with a normally gaseous hydrocarbon, such as propane or butane, which is maintained in a liquid state by the application of pressure in excess of the critical pressure, causing the coloring matter contained in said petroleum oil to be adsorbed by the adsorption medium, withdrawing the decolorized solution out of contact with the adsorption medium under a sufficient pressure to maintain the diluent in a liquid condition, separating the diluent from the decolorized oil by distillation and condensation under pressure and returning the liquefied diluent to the initial stage of the process for continued re-use.

Accumulations of the asphaltic and ceresenic compounds, or other deleterious substances abstracted from the oil by this process, periodically may be removed from the adsorption medium by washing the latter with a counter-flow current of the same or similar normally gaseous hydrocarbon, maintained in a liquefied condition by the application of pressure, withdrawing the discolored wash out of contact with the adsorption medium, under a sufficient pressure to maintain the solution in a liquid condition and reclaiming the solvent from the solution by distillation and condensation under pressure, returning the liquefied solvent to the initial stage of the process for continued re-use.

The principles underlying the decolorization of various fluids by an adsorption effect, which usually is associated with certain filtering media, are well-known and have been extensively applied in petroleum refinery practice to the treatment of various oils by percolation or contacting with such materials as fuller's earth, bauxite, bone char and silica gel. So far as known however, these principles have never been applied to the treatment of solution of petroleum oils diluted with normally-gaseous hydrocarbon substances, which require an application of pressure to maintain them in a liquid condition.

It is generally accepted that any decolorization process accomplished by filtration is contemplated by certain physical laws of adsorption, which relate to the changes in concentration of solutions at the interface of the solution and the adsorption medium. According to these laws, it follows that in all cases involving a change in the original surface tension of the pure solvent by the dissolved substance, the concentration of the latter within the thin surface layer between these two phases must necessarily differ from that which exists throughout the remaining mass of the solution and this concentration must change so as to minimize the surface tension effect. In other words, if the surface tension of the pure solvent be depressed by the dissolved substance, the latter has a tendency to concentrate at the free surface of the solution and the concentration at the surface layer will become greater than that of the rest of the solution.

It follows, therefore, that when a solid substance is introduced into a solution, and the surface tension at the limiting surface of these two phases falls as the concentration increases, the concentration within the surface layer will actually increase in this instance, and the concentration thruout the remainder of the solution will correspondingly decrease. If the surface of the solid material be sufficiently large, the weakening of the solution concentration may then become susceptible of a direct determination, and it can then be said that the solid substance has adsorbed a portion of the dissolved substance on its surface.

It is the intention and purpose of this invention to accomplish a definite improvement and acceleration in the separation of the dissolved color-producing substances in petroleum oils, by the adaptation of certain phases of these laws which hitherto have been neglected.

The process of adsorption may be regarded as a manifestation of the physical-chemical forces of attraction which reacts upon the molecules of all chemical substances, including those of the saturated group, and creates an inter-molecular attraction which exists between similar and dissimilar molecules alike. The heat of moistening may serve as an approximate measure of this force in the instance of the attraction of liquids by porous substances. It has been noted that liquids of greatest chemical activity produce the greatest heats of moistening; first with unsaturated compounds then with the oxygen and nitrogen-containing compounds, which are elements tending to change from a di- or tri-valency to a tetra- or penta-valency. The smallest evolution of heat occurs in the moistening of porous substances by paraffin hydrocarbons and naphthenes, and with certain saturated and symmetrically constructed compounds such as carbon tetrachloride.

In order to properly utilize these physical-chemical forces in the decolorization of petroleum oils, a considerable advantage can be obtained by the dilution of the oil to be filtered with some of the lighter hydrocarbons; this procedure requires the maintenance of certain pressures which will cause these hydrocarbons to liquefy. The heat of moistening which occurs when a porous substance is saturated with the liquid hydrocarbons composing the various homologous groups, will increase in relation to the molecular weight of the liquid. Thus, for example, a high molecular-weight naphthenic liquid, will indicate a greater heat of moistening than a light paraffinic hydrocarbon.

The hydrocarbon propane approaches the requirements for an ideal diluent and possesses very desirable characteristics from the standpoint of eliminating heat of reaction due to wetting or moistening of the adsorbent, but a lighter hydrocarbon material, particularly one that is predominated by methane or ethane, may be preferable because of lower molecular weight and viscosity.

In usual petroleum refinery practice, it has been customary to dilute the heavier and more viscous oils with naphtha, gasoline and frequently kerosene before treatment with an adsorption medium. Otherwise, the oil would not invade the interstices and capillary surfaces of the adsorbent material readily, nor would it be possible to establish a satisfactory relationship between the yield of decolorized oil and volume of adsorbent material required for treatment. The final filtration required to finish many of the heavy oils, does not, however, lend itself readily to treatment in dilute solutions, and the oil is frequently heated in such instances to reduce the viscosity to some practical value which will insure a reasonably efficient and expeditious operation. Ordinarily, the practice of heating the oil to obtain greater fluidity characteristics for filtration purposes is applicable only within certain restricted limits, as high temperatures cause an excessive degree of oxidation in the finished oil and cause the color to become darkened.

It has been noted, in general, that the lighter and more volatile petroleum naphthas have constituted the most desirable class of diluents for filterable petroleum oils, altho their use in conventional petroleum refinery practice usually is discouraged because of excessive losses of the naphtha from the conventional systems of open tankage and low pressure equipment. The decrease in molecular weight of the hydrocarbon diluent appears to bear a definite relationship to the efficiency of the filtering operation. This hypothesis can be anticipated by consideration of the fact that the most efficient adsorbents are those which present the greatest adsorptive surface per unit volume, inferring that such materials will contain a large number of capillary surfaces which are capable of being wetted only by extremely fluid substances. Since the hydrocarbons of lowest molecular weight are those which are in a gaseous state under normal conditions of temperature and pressure, it follows that such substances, if liquefied under suitable conditions, should constitute a class of diluents for filterable oils which would be vastly superior to any of the materials in common use, due to increased fluidity and improved wetting ability in respect to the capillary surfaces of the adsorptive medium.

Petroleum oils generally are miscible with the liquefied hydrocarbon diluents in practically all proportions at ordinary temperatures, altho the mixing of the oil and diluent is favored in most cases by heating the solution to 100–125° F. It is preferred, therefore, to maintain the diluent in a liquid state by regulation of the critical pressure in respect to the particular temperatures encountered at various stages throughout the process, rather than by the use of certain controlled cooling means which will maintain the temperatures below a critical value. It is furthermore of value to maintain the solution temperatures within certain ranges in order to avoid the possibility of including the surfaces of adsorbative medium with accumulation of solid paraffine waxes which are frequently formed in the solution at temperatures within the normal atmospheric range.

Observations have disclosed, however, that the most effective separation of the color producing substances from the oil in solutions of this type does not necessarily occur at the temperatures at which the blending operation is conducted. It is therefore desirable to immediately lower the temperature after blending the oil and diluent together, altho not to any extent which will cause a separation of the solid paraffine waxes as previously pointed out.

Present commercial methods for the treatment of petroleum oils in the removal of discoloring substances such as by percolation filtering, employ a closed cylindrical shell filled with fuller's earth or similar adsorption medium, thru which the raw oil, either in an undiluted state or in solution with naphtha, is pumped continuously. A spent charge of the adsorptive material within the filter is restored to use by washing in place with a current of warm naphtha, after which the filter is steamed to remove the last traces of naphtha, and the adsorptive material is subsequently removed from the filter and roasted in a suitable type of retort to free it from accumulations of coloring matter. Fresh fuller's earth employed in this manner usually will retain a reasonable degree of decolorizing efficiency thru-out fifteen to twenty reactivations, altho it is believed that disintegration of the particles due to continued handling is in some measure responsible for the shortened life of the material. It is an outstanding advantage of the present invention that the necessity for removing the adsorptive material from the filter for roasting, is lessened considerably due to the effectiveness of the solvent wash and that the life of the material is greatly prolonged thereby.

The various features of the invention will now be readily understood by reference to the accompanying drawing.

The liquefied diluent is contained within the storage tank 1, under pressure and is removed by the pump 2. The oil to be decolorized is contained within the storage tank 3 and is removed by the pump 4. The streams of oil and diluent are combined and are conveyed by piping as indicated, into the heater 5, which may consist of a steam coil within an enlarged conduit and which preferably raises the temperature of the solution to 100-125° F. The heated solution then passes into the mixer 6, which may consist of a number of eccentrically located baffles within an enlarged conduit and which serves to mix the heated solution thoroughly. The mixture then passes immediately into a cooler 7, consisting in the illustration of a water-cooled coil within an enlarged conduit, which lowers the temperature somewhat below the blending temperature, but not sufficiently to effect a separation of the solid paraffine waxes. The solution is then introduced alternately into the percolating filters 8, 9, by proper manipulation of the feed valves 10, 11. The filters are preferably vertically-disposed cylindrical vessels containing beds of adsorbent material, which receive an evenly distributed flow of solution. The filtrate is withdrawn thru the valves 12, 13, and is discharged into the upper part of a conventional type of stripping column 14, which is heated by a closed steam-heating coil in the lower section. The diluent is vaporized within the stripping column, and is condensed into its original liquid state in the condenser 15, consisting here of a water-cooled coil within an enlarged conduit. The condensed diluent is then forced by system pressure thru the check valve 16, back into the storage tank 1 for continued re-use. The finished decolorized oil is removed from the lower part of the stripping column 14 and is discharged into the storage tank 17 thru the cooler 18, which comprises a water-cooled coil enclosed within an enlarged conduit.

The adsorbent material within the filters 8, 9, is reactivated periodically by washing with hydrocarbon diluent removed from storage tank 19, thru the pump 20. The wash is heated in the steam heater 21, which may be similar to the heater 5. The heated wash is introduced alternately into filters 8, 9, thru manipulation of the valves 22, 23, and the discolored wash is conveyed thru the valves 24, 25, directly into the stripping column 26, which may be similar to column 14. The wash solvent is vaporized within the stripping column 26, and is condensed into its original liquid state in the condenser 27, similar to the condenser 15. The condensed solvent is discharged thru the check valve 28, to storage tank 19, for continued re-use. A sludge composed of the abstracted matter is removed from the base of the stripping column 26 and is transferred to the storage tank 29, after passing thru cooler 30, which is similar to cooler 18. In certain instances, it may be desirable to use the same hydrocarbon substance for a diluent and as a wash, in which event, the wash storage tank 19, is eliminated and the outlet and return connections are made directly with the diluent tank 1. The operation described intends that the filter 8, be operated while filter 9 is being washed, and vice versa. In this manner, a practically continuous operation is obtainable.

In removing the spent adsorbent material from the filters 8, 9, after the solvent wash is no longer capable of restoring its acitivity, it becomes necessary to completely remove all possible traces of the hydrocarbon diluent and solvent before the material is discharged. For this purpose the internal steam heating coils 31, 32, are provided and used to expel the diluent or solvent thru the vapor header valves 33, 34, into a vapor recovery system, which may comprise with tank 35, a conventional compressor and gas-cooler system, where the hydrocarbon material is liquefied and returned through line 36, to storage either at 1, or 19, according to its nature.

When solutions are made with a very light diluent, having the properties of a light normally gaseous hydrocarbon such as ethylene or propane, liquefied under pressure, or in carbon dioxide similarly liquefied, the particles of coloring are more free to move about in the solution and follow the laws of colloidal behavior more closely. In this type of solution, the colloidal or finely-divided particles can be agglomerated or attracted to a nucleus, thus facilitating their removal from the oil to be clarified or decolorized.

A simple and efficient decolorizing and treating method is therefore made possible by employing some normally gaseous material such as propane which has been liquefied under pressure as a diluent for the oil to be treated. Liquefied carbon-dioxide may be similarly employed as a diluent and may be used also in combination with one or more normally gaseous hydrocarbons for this purpose. The agglomerated particles of coloring matter are adsorbed loosely to the surfaces of the filtering medium and may be periodically removed by washing the filter bed with chloroform, benzol or other solvent which is preferential toward asphaltic or resinous substances.

The hydrocarbon diluent itself, or a substance of similar nature may be employed for the purpose of washing the filter bed free of the accumulations of coloring matter, although the particular temperature ranges within which the solvent action of these substances will embrace the asphaltic and resinous compounds is obviously subject to adjustment, depending upon the particular oil to be treated. The removal of the discoloring substances from the filtering medium can be made sufficiently complete by this washing procedure to greatly minimize, if not entirely eliminate the necessity of roasting the spent material in order to effect revivification.

Further advantages may be derived by passing the solution of raw oil and diluent first through a bed of crushed quartz, pumice, sand, tripoli stone or other inert material of a calcareous or vitreous nature, which will expose a large surface for the accumulation of the precipitated colloids or other finely-divided forms of discoloring substances. The agglomerated material can be periodically dislodged from the clarifying apparatus by flushing the bed with a suitable electrolyte such as a strong brine solution. The use of the inert material will enable the greater part of the separated discoloring material to be removed from the oil in an initial stage of the process and will permit a substantial saving to be effected in the use of adsorbent material as this will be required only to a limited extent as a finishing stage in the process when treating certain oils.

In the illustration, a "pre-filter" of such character is indicated at 37, containing quartz, sand, or the like, connected in the line 38 from the combined heating, mixing and cooling system and arranged when valves 39, 40, are opened and valves 41, 42 are closed, to be cut in ahead of filters 8, 9 and in series with whichever filter is in operation. The removal of the heavier coloring matter in this pre-filter leaves the clay in the adsorbent filters so much the freer to act on the remaining, lighter, coloring material, producing in the end a better grade lubricant. This pre-filter may be arranged for washing and the driving off and recovering of diluent and solvent, similar to the clay filters. Thus with valve 43 opened from the line 44, the pre-filter may be washed with the color removing solvent, which then, with valve 42, opened, discharges to the solvent stripper 26. That part of the production line in which the valve 41, is located, may be used as a bypass about the pre-filter upon closing valves 39, 40. An internal steam coil is indicated at 45, for expelling diluent or solvent from the pre-filter and at such times the latter may be cut in on the vapor recovery line 46, upon opening valve 47. As indicated, the pre-filter may be identical with the decolorizing filters except that it contains simply a finely divided substance, not necessarily adsorbative, which will provide a surface for the deposition of the coloring matter.

In the illustration, provision is made for bypassing the mixture about the cooler and sending it direct from the mixer to the filter. This is accomplished by opening a valved bypass 48 and closing valves 49, 50, to the cooler.

The invention provides a practical and efficient process and apparatus for removal of coloring matter and other extraneous material from petroleum oils by treatment with an adsorption medium while in solution with a normally-gaseous hydrocarbon maintained in liquid condition by the application of pressure.

The invention provides further a process and apparatus for producing a decolorized filtrate solution from which the diluent may be separated by subsequent distillation and condensation under pressure and the returning of said diluent to the initial stage for subsequent re-use.

The invention provides also process and apparatus to reactivate the spent adsorption medium employed, which will utilize a normally-gaseous hydrocarbon, liquefied by the application of pressure, as a solvent wash to remove the accumulations of asphaltic or ceresenic compounds, or other color producing substances.

Further, the invention provides process and apparatus in which a clean solvent will be removed from the discolored wash solution by distillation and subsequent condensation under pressure and the returning of said solvent to the initial stage for subsequent re-use.

While the invention has been described in its preferred form as now contemplated, it will be evident that many changes may be made without departing from the true scope of the invention. The process and apparatus may be applied to the decolorizing and filtering of animal and vegetable oils and to the renovating of used crankcase and transformer oils, provided the properties involved are sufficiently similar to those of the various substances mentioned. The foregoing description is by way of illustration primarily, rather than limitation and the invention is therefore to be understood as including modifications of the foregoing process and apparatus and as limited only by the prior art and the intent of the appended claim.

What is claimed is:

The herein disclosed process of refining viscous lubricating oils, which comprises dissolving and heating to from about 100° to about 125° F. viscous lubricating oil in liquefied normally gaseous hydrocarbon under pressure sufficient to maintain the solvent liquid and at elevated temperatures, removing suspended matter for which the solvent has an antisolvent effect at such temperature by passing the solution through a bed of inert filtering medium and then decolorizing by passing said solution directly and continuously from said inert filter bed through a bed of adsorbent decolorizing medium.

ROBERT E. STANTON.